United States Patent [19]

Ganser

[11] Patent Number: 4,838,231

[45] Date of Patent: Jun. 13, 1989

[54] ELECTRONICALLY CONTROLLED FUEL INJECTION SYSTEM

[75] Inventor: Marco A. Ganser, Zürich, Switzerland

[73] Assignee: Ganser-Hydromag, Zurich, Switzerland

[21] Appl. No.: 101,101

[22] Filed: Sep. 25, 1987

[30] Foreign Application Priority Data

Sep. 25, 1986 [CH] Switzerland .................. 3836/86

[51] Int. Cl.⁴ ........................................... F02M 39/00
[52] U.S. Cl. ..................................... 123/467; 123/447
[58] Field of Search ............... 123/506, 446, 447, 458, 123/456, 467

[56] References Cited

U.S. PATENT DOCUMENTS

| | | | |
|---|---|---|---|
| 4,258,674 | 3/1981 | Wolff. | |
| 4,479,475 | 10/1984 | Babitzka | 123/446 |
| 4,545,352 | 10/1985 | Jourde | 123/467 |
| 4,566,416 | 1/1986 | Berchtold | 123/458 |
| 4,662,338 | 5/1987 | Itoh | 123/467 |
| 4,674,448 | 6/1987 | Steiger | 123/446 |
| 4,709,679 | 12/1987 | Djordjeuic | 123/467 |
| 4,712,528 | 12/1987 | Schaffitz | 123/447 |
| 4,719,889 | 1/1988 | Amann | 123/467 |

FOREIGN PATENT DOCUMENTS 1176110 4/1959 France.

Primary Examiner—Carl Stuart Miller
Attorney, Agent, or Firm—Lowe, Price, Leblanc, Becker & Shur

[57] ABSTRACT

The fuel injectors (4) of an internal combustion engine (2) are connected to a pump (10) by means of fuel supply lines (12) which open into the high-pressure part (34) of the injectors (4). The cross-sectional area of the fuel connection (12, 34) between the pump (10) and the injection orifices of the injectors (4) is substantially bigger than the total cross-sectional area of all of the injection orifices of an injector (4). An unrestricted flow path for the pressurized fuel is provided between the pump (10) and the area immediately upstream of the injection orifices. Due to the small pressurized volume of the system, the transient behaviour of the injection system is fast and can easily be matched to the needs of a particular engine application.

13 Claims, 4 Drawing Sheets

ELECTRONICALLY CONTROLLED FUEL INJECTION SYSTEM

TECHNICAL FIELD OF THE INVENTION

The present invention relates to a fuel injection system for internal combustion engines and, more particularly, to an electronically controlled injection system. Since the system operates at a high fuel pressure, it is particularly suited for the direct injection of fuel into the combustion chamber of each cylinder of the internal combustion engine. This injection system can be used advantageously in diesel engines.

BACKGROUND OF THE PRIOR ART

Different designs of fuel injection systems are disclosed in the following publications:

German published patent application No. 32 27 742 (corresponding to U.S. Pat. No. 4,566,416); U.K. Pat. No. 2 165 895 (corresponding to U.S. Pat. No. 4,633,837; German published patent application No. 31 26 393 (corresponding to U.K. Pat. No. 80 21 836; German published patent application 29 07 279; French published patent application No. 2 546 237 (corresponding to U.S. Pat. No. 4,535,742) and French patent specification No. 1,176,110 (corresponding to U.K. Pat. No. 818 197).

In German published patent application No. 32 27 742 and U.S. Pat. No. 4,566,416 an injection system is disclosed employing injectors provided with an accumulator volume or chamber with a volume substantially larger than the maximum volume of fuel injected during each injection event. This accumulator chamber is located in the injector body upstream of the seat of the injector needle valve. The injection orifices are located downstream of this seat. These orifices communicate with the combustion chamber of the related internal combustion engine. The fuel stored in the accumulator chamber under high pressure is partly discharged through the injection orifices during each injection event with a simultaneous pressure drop in the accumulator chamber. The injector accumulator communicates with the high pressure fuel supply line of the injection system by means of a restricted passage or orifice. The orifice, due to its small cross-sectional flow area, prevents the formation of noticeable pressure waves in the fuel supply lines during each injection event. Such pressure waves would highly affect the uniform fuel distribution in a multicylinder engine and the stability of the injection events of a single injector from cycle to cycle.

To obtain good engine performance with respect to engine power, efficiency and emissions, a very uniform fuel distribution from cylinder to cylinder must be achieved in a multicylinder engine at each engine operating point. The same holds true for each injector from cycle to cycle. In addition to said orifice between each injector accumulator and the fuel supply line, a plenum fuel chamber communicating with the fuel supply lines of all injectors of the injection system is provided in order to achieve the desired uniform fuel distribution. Due to its relatively large volume, the plenum chamber evens out the pressure pulsations created by the high pressure fuel supply pump and thus creates a constant pressure level for all injectors. At different points in the engine operating range, different fuel injection pressures are required. As an example, it is advantageous to use a low injection pressure at low engine load and at idling and a high injection pressure at high engine load and high speed.

In a passenger car engine, transient speed and load conditions are the most often encountered situation, and the injection system pressure must be able to rapidly respond to the warming driver demands. It must be possible to rapidly increase and drop the fuel pressure in the plenum chamber. Due to its large volume, this is a difficult task to accomplish.

In the injection system disclosed in UK Pat. No. 2 165 895 and the corresponding U.S. Pat. No. 4,633,837 the fuel metered by a high pressure pump is delivered to a fuel manifold. Fuel lines lead from this manifold to the injectors. In each line section connecting one injector to the fuel manifold there is placed an electrically operated on/off valve. To allow for the momentary injection of fuel by an injector, the on/off valve must be opened. The injector needle valve will subsequently be opened against the closing bias force of a spring by the fuel pressure propagating from the on/off valve to the needle valve seat. To terminate each one of such momentary injection events, the on/off valve must be closed to allow the fuel pressure at the injector to drop below the bias force of the needle valve spring which consequently closes the injector needle valve. In the period between two injection events of one injector the pressure in the line section between the on/off valve to the injection valve seat is lower than the injector needle valve opening pressure and thus substantially lower than the injection pressure during the injection event. The actual injection pressure at the end of the injection event is low, according to the closing force of the injector needle valve spring, which results in poor fuel atomization and increased pollutant emissions of the related internal combustion engine.

In the injection system of the German Pat. No. 31 26 393 fuel is delivered under high pressure to a fuel chamber similar to the plenum chamber disclosed in the aforementioned German Pat. No. 32 27 742. From this chamber fuel is fed by fuel lines of a small inner diameter to the injectors of the injection system. The pressure drop at each injector during each injection event is used to control the fuel delivered by each injector into the combustion chamber of the related internal combustion engine. This last system appears to have the same basic disadvantage as the system disclosed in German Pat. No. 32 27 742 discussed earlier, namely poor response of the system pressure during transient engine operation.

SUMMARY OF THE INVENTION

It is now an object of the present invention to provide a new and improved fuel injection system, which allows elimination of the above-mentioned plenum chamber required in prior art injection systems while maintaining a uniform fuel distribution at each engine operating point.

Each injector of the injection system of the present invention is electromagnetically operated. The injector needle valve is opened and closed by the pressures acting on both sides of a needle valve piston. An electromagnetically operated valve controls the fuel pressure at the top end of the needle valve piston. In this way, it is possible to open and to close the injector needle valve at a fuel pressure level, in the region immediately upstream of the seat of the injector needle valve, almost as high as a the highest pressure during each intermittent injection event, with consequently good fuel atomization and reduced pollutant emissions of the related internal combustion engine.

Furthermore, the new and improved design of the injector needle valve piston of each injector allows elimination of the injector accumulator chamber as well as the orifice between each injector accumulator and the fuel supply line of the prior art fuel injection systems. Because of the novel design of the injector needle valve piston, it is no longer important that the pressure level in the fuel supply line to each injector remains constant. Pressure pulsations are thus allowed, as long as they are the same for all injectors.

These and other advantages of the invention will be readily apparent from the following detailed description of preferred embodiments of the present invention taken with the accompanying drawing.

DETAILED DESCRIPTION OF THE PREFERRED EMBODIMENTS

Figure 1:
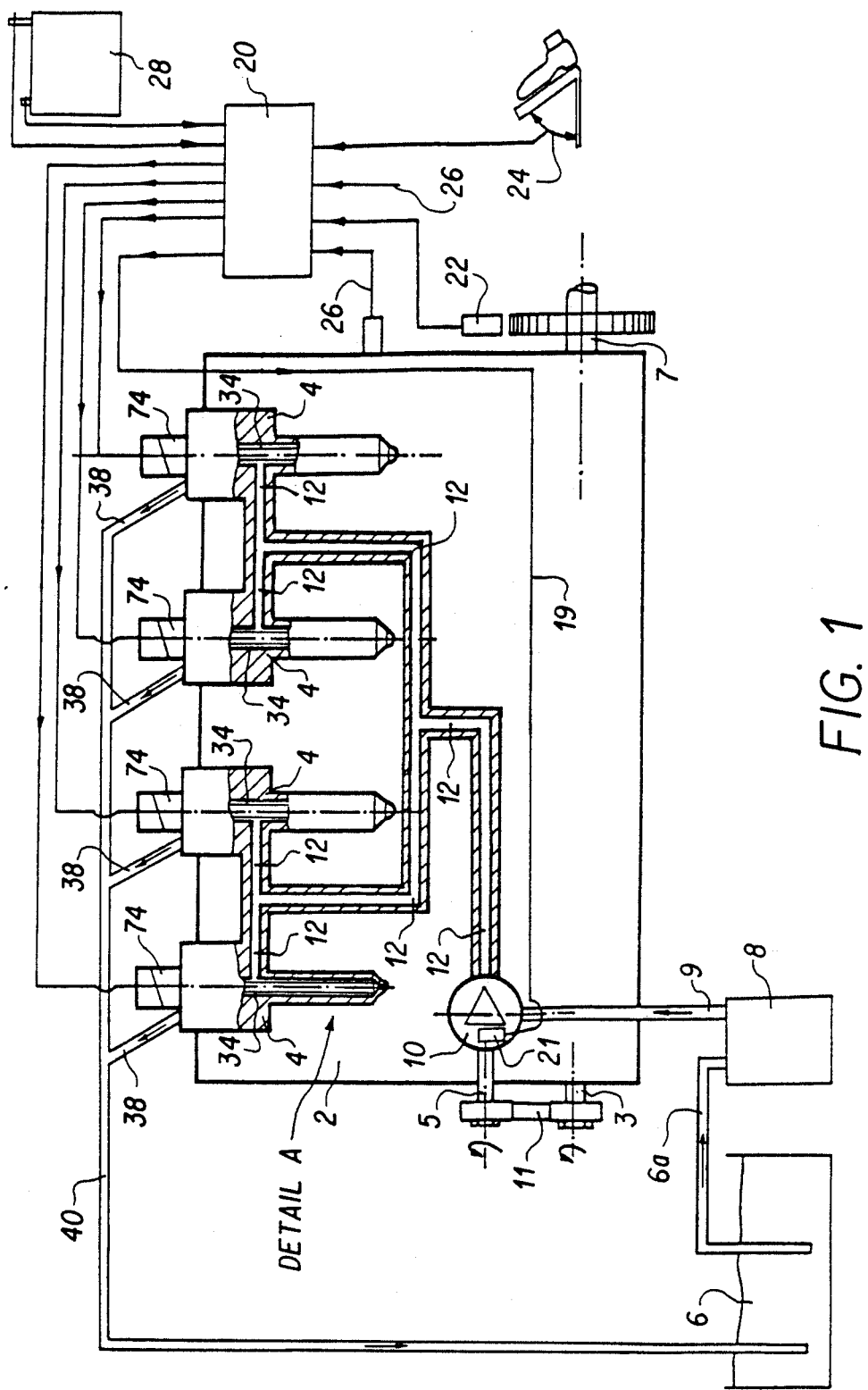
FIG. 1 is a schematic view of an electronically controlled injection system in accordance sith the present invention.

Turning to the figures wherein like numerals are employed for identifying like parts, the disclosed electronically controlled fuel injection system is employed in a four cylinder engine 2. On the upper part of the engine 2 there are placed four electronically controlled injectors 4 to inject pressurized fuel into the combustion chamber (not shown) of the engine 2. The fuel comes from a fuel tank 6 and reaches through a low pressure pipe 6a a fuel filter 8 and, through another low pressure pipe 9, a high pressure pump 10. The drive shaft 5 of pump 10, which can be a one- or multicylinder pump, depending on the specific application, is driven by a shaft 3 of the engine 2 with a constant drive ratio, for example by means of a gear or a tooth-belt 11. As an important matter, the motion of the plunger or plungers of pump 10 shall be harmonic and each pumping event takes place over a large angle of rotation of the pump drive shaft 5 and thus also of the engine crankshaft 7. Preferably, the maximum fuel delivery of the pump 10 per revolution of the engine crankshaft 7 is substantially equal to the maximum fuel quantity delivered to the engine and spilled back to the tank by the totality of the injectors 4 of the injection system in one revolution of the engine crankshaft 7.

Furthermore the number of pumping strokes taking place is the same or an entire multiple of the number of injection events. In the case of the embodiment of FIG. 1, and where the engine 2 is a four cycle engine, two combustion events and thus two injection events take place during each revolution of the engine crankshaft 7. In this case one could use a two-plunger pump 10 driven by the engine 2 with a drive ratio of 1:1 in order to obtain the same number of pumping strokes and injection events. Each pumping event would then take place during 180 degrees rotation of crankshaft 7. Since the pumping event takes place over a wide angle of rotation of the crank shaft 7 and the injection event is of a relatively short duration, there is no relationship between the momentary pumping rate of any of the pumping plungers of pump 10 and the injection rate of any of the injectors 4. Nevertheless it is preferred that the injection event of each of the injectors 4 of the injection system takes place during the pumping stroke of any one of the pumping plungers of the pump 10.

For the same four cylinder engine 2 as shown in FIG. 1, one could also use a single-plunger pump 10 driven by the engine 2 with a drive ratio between pump shaft 5 and crankshaft 7 of 2:1. Also a single-plunger pump 10 driven with a 1:1 drive ratio but with a construction providing two strokes of the plunger per revolution of the pump shaft 5 could be employed.

The outlet of pump 10 is connected to a plurality of high pressure lines 12 which belong to the high pressure section of the injection system.

The fuel delivered by the pump 10 to this high pressure section of the injection system, and to the high pressure lines 12, can be regulated depending on the engine operating conditions, within the pump 10 in a manner known from already employed in-line or distributor type fuel injection pumps. As shown in the drawings, this regulating process is taken care of by an electronic control unit 20 and appropriate actuators 21 (not shown in detail) placed within the housing of the pump 10 and connected to the control unit 20 by means of an electrical connection 19.

The control unit 20 also operates the solenoid 74 of each injector 4. The main input signals to the control unit 20 ar the crankshaft angle position sensed by a pick-up sensor 22 and the position of the throttle pedal 24. Further input signals 26 such as engine coolant temperature, intake air or boost pressure, etc. can be fed to the control unit 20 as well. The control unit 20 is powered by a battery 28.

The control unit 20 comprises a one-chip microprocessor and the required input and output power modules. The desired relationships between the input signals and the output signals to the injector solenoids 74 and to the actuator 21 of the pump 10 are programmed into the microprocessor. The required data needed to determine the momentary value of the output signals as a function of the momentary input signals are stored in the microprocessor memory. The microprocessor can also be used to perform troubleshooting diagnostics of the combined engine and fuel-injection systems.

The high pressure section of the injection system of FIG. 1 consists of the high pressure pipes 12 and the high pressure section 34 of each injector 4. From each injector 4 a low pressure spill pipe 38 and a low pressure pipe 40 connecting all pipes 38 returns low pressure fuel released from each injector 4 back to the fuel tank 6.

The design of the high pressure section 34 of each injector 4 will be discussed later in connection with FIG. 2.

It is important to note at this point that each high pressure pipe 12 provides for a direct flow path without any restriction from the high pressure pump 10 to each injector 4. As shown in the detail A of one of the injectors 4, a direct and unrestricted hydraulic connection is made between the outlet side of the high pressure pump 10 to the region around the seat of the injector needle valve in the tip of each injector 4 by means of the high pressure pipes 12 and the high pressure section 34 of the injector 4.

With the above-mentioned layout of the high pressure section of the injection system of FIG. 1 consisting of high pressure pipes 12 and of one high pressure section 34 in each injector 4, it is possible to eliminate any fuel plenum chambers as well as an accumulator volume placed within the injector's body as described in German Pat. No. 37 27 742 (corresponding to U.S. Pat. No. 4,566,416) and German Pat. No. 31 26 393.

The essential features of the fuel injection system of the present invention are as follows:

the entire fuel volume enclosed under high pressure in the lines 12 and sections 34 of each injector 4 hydraulically communicates within this high pressure section in an unhindered, unrestricted way, the cross sectional areas of all high pressure passages leading from the outlet of the pump 10 to the region around the seat of the injectors 4 of the injection system is substantially bigger preferably at least 10 times bigger than the combined cross-sectional area of all injection orifices of one injector 4, during engine operation the entire high pressure section is permanently pressurized to a pressure substantially equal to the injection pressure suitable at given engine running conditions.

According to the present invention it is therefore possible to largely reduce the total high pressure volume of the injection system (by over an order of magnitude) compared to the prior art systems referred to earlier. This allows achievement of a fast response during transient operation of the engine 2, which allows employment of the injection system for example for passenger car engines without the need of an overdimensioned pump 10 or of a complex control scheme to take care of the transient engine operating conditions.

The reduction of the pressurized fuel volume to a minimum suited for a given application is a big advantage of the fuel injection system according to the present invention.

However, due to pressure waves arising in a system as just described, an injector design insensitive to pressure waves must be used in conjunction with this system in order to maintain the desired uniformity of fuel delivery of the injectors 4. A preferred design of such an injector 4 is shown in FIG. 2.

If the injection system of the present invention is used in an engine with a wide speed range, such as a passenger car engine, it is important that each pumping event takes place over a large angle of rotation of the engine crankshaft 7. In the discussed arrangement of FIG. 1 with a two plunger pump, driven by the engine with a drive ratio of 1:1, each pumping event takes place over 180 degrees of rotation of the crankshaft 7.

The slow, harmonic pumping motion makes it possible to avoid high pressure peaks at a high engine speed, which would be detrimental to the mechanical durability of the components of the injection system. At the same time, due to the fact that there is no relationship between the momentary pumping rate of the pumping plungers and the injection rate of any of the injectors 4, the injection pressure can be maintained at a high level when the engine speed is slow. Both attributes allow optimization of the engine performance with respect to power, noise and emissions.

It is, furthermore, important that, as shown in FIG. 1, the injection system's high pressure section is built in such a way that it is symmetrical with respect to the arrangement of the fuel lines 12. Accordingly, the time for a pressure wave to travel from any one of the injectors 4 to the outlet side of the pump 10 or vice-versa will be the same for all injectors 4 employed.

In an alternate arrangement of the injection system according to the present invention (not shown in FIG. 1), each injector 4 is connected by fuel lines 12 of equal length directly to the housing of the pump 10. In this case a hydraulic connection between the fuel lines 12 would also be provided within the housing of the pump 10.

Figure 2:
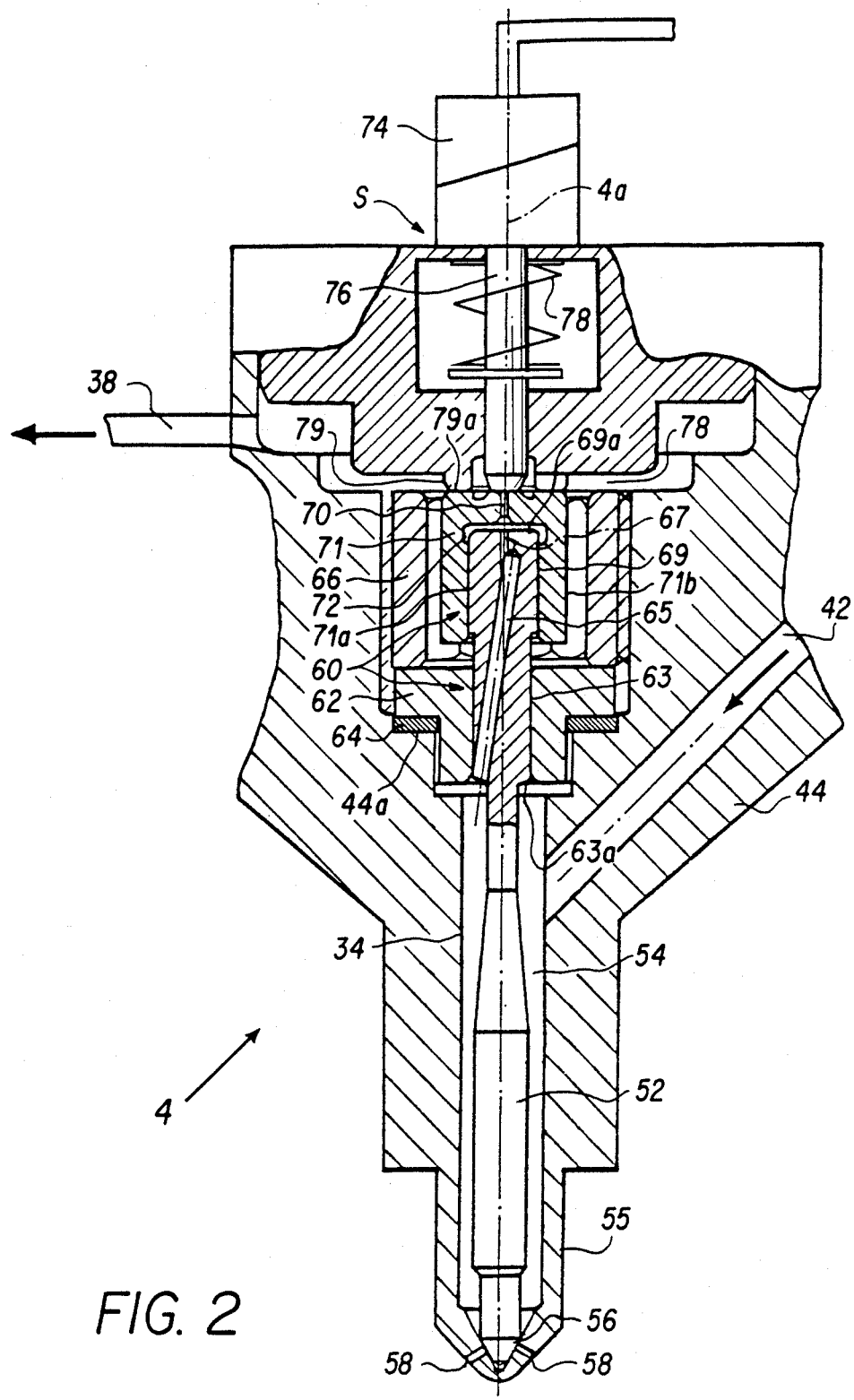
FIG. 2 is an enlarged fragmentary axial sectional view of an embodiment of an injector used in the injection system in accordance with the present invention, showing the design of the injector needle piston.

FIG. 2 shows the main portion of an injector 4 of preferred design, which can be employed advantageously in conjunction with the injection system of FIG. 1. The pressurized fuel coming from one of the high pressure lines 12 shown in FIG. 1 enters the injector 4 through bore 42, which is machined into the housing 44 of the injector 4. The bore 42 is connected to a bore 54 which extends downwards in axial direction to the needle valve seat 56.

An injector needle valve 52 is arranged within the bore 54 and extends downwards into the injector neck 55 and to the needle valve seat 56. A shown in FIG. 2 the tip of the needle valve 52 is engaged with the valve seat 56 and closes the injection orifices 58, thus preventing pressurized fuel from being injected from the bore 54 through the seat 56 and the injection orifices 58 into the combustion chamber of the related internal combustion engine (not shown). As already mentioned, the cross-sections of the flow passages from bore 42 to the valve seat 56 are big compared to the total cross-sectional flow area of all injection orifices 58. The needle valve 52 can be momentarily shifted axially in order to open the injection orifices 58 and to allow injection of a desired quantity of fuel.

On the end opposite to its tip, the injector needle valve 52 is provided with a needle valve piston 60 with two sections of different outer diameters. The outer diameter of the lower section 63 is tightly matched to the inner diameter of a guide-piece 62. The latter has an enlarged portion which, together with a sealing ring 64, is pressed against a shoulder 44a of the injector housing 44 by an internal hexagon-screw 66, thus sealing the high pressure section of the injector 4.

The outer diameter of the upper section 69 of the needle valve piston 60 is larger than the outer diameter of the lower section 63. The needle valve piston 60 with its two sections 63, 69 of different outer diameters is firmly connected to the injector needle valve 52, either because it is made of one piece with the injector needle valve 52 as shown on FIG. 2, or by firmly connecting the two parts 52, 60 to one another, for example by press-fitting or by welding the parts together. A bore 65 machined in the inner part of the needle valve piston 60 is connected at one end to the bore 54 of the injector 4. The other end of bore 65 is connected to a restricted orifice 67 with a substantially smaller flow cross-sectional area compared to the cross-sectional area of bore 65. The other end of the orifice 67 extends through the upper end surface 69a of the thicker section 69 of the needle valve piston 60.

The outer diameter of the thicker section 69 is tightly matched to the inner bore 71a of a cylindrical piece 71 which is closed at one end and provided with an orifice 70 opening into a chamber or space 72. The latter is defined by the piece 71 and by the thicker section 69 of the needle valve piston 60. Both orifices 67 and 70 are axially aligned and extend along the longitudinal axis 4a of the injector 4.

A solenoid valve S is provided that has a solenoid 74 which actuates a valve stem 76. As shown in FIG. 2, the valve stem 76 is closing the outlet of the orifice 70, thus preventing fuel to flow through the orifice 70 into the neighbouring low pressure region 78 which is connected the return line 38 (see also in FIG. 1). The piece 71 will be pushed by the fuel pressure in the chamber 72 against a flat surface 79a of a support 79, which determines the axial position of the piece 71 and at the same time guides the valve stem 76.

As an important matter, the piece 71 is guided in a tight fit relationship at an inner surface 71a only by the thicker section 69 of the needle valve piston 60. The outer surface 71b of the piece 71 is not guided. This allows a substantially seal-tight, leak-free design and an unhindered axial motion of the injector needle valve 52 during the injection event. If the piece 71 had to be guided also at its outer surface 71b, due to the tight fits needed for reasons of fluid seal tightness, jamming of the needle valve piston 60 or at least undesired high frictional forces could occur in case the tight fits needed for a tight seal are not perfectly concentrical to one another.

The mode of operation of the injector 4 is as follows:

When at a desired point in time the solenoid 74 is energized by an electric pulse of a predetermined duration coming from the control unit 20, the valve stem 76 is retracted from its seat and the outlet of the orifice 70 is opened. The pressure in the chamber 72 will abruptly drop, due to the formation of a single fuel jet in the two aligned orifices 67 and 70. The fuel pressure acting on the underside 63a of the lower section 63 of the injector needle valve piston 60 can now shift the needle valve 52 in its opened position and the injection event begins by discharging fuel through the injection orifices 58. The release of fuel results in a negative pressure wave which propagates from the injector 4 into the high pressure section of the injection system of FIG. 1.

If the electric pulse to the solenoid 74 is interrupted, the solenoid valve 76 is shifted back to its seat at the outlet of the orifice 70 by the spring 78. The pressure in the space 72 will abruptly rise. Since the upper surface 69a of the upper, thicker section 69 is greater than the lower surface 63a of the lower, thinner section 63 of the needle valve piston 60, a force to quickly reseat the injector needle valve 52 and thus terminate the injection event results, even if the fuel pressure in the bore 54 is equal to the pressure in the space 72. Even a pressure wave in the system does not noticeably disturb the closing of the injector needle valve. This is not the case in the solution disclosed in the German Patent No. 32 27 742 where the injector needle valve piston is of a uniform outer diameter. In this case, a pressure wave acting on the underside of the needle valve piston would drastically affect the closing behavior of the injector needle valve and thus the uniformity of fuel delivery. For this reason an accumulator chamber within the injector housing and an orifice between this accumulator and the fuel supply line had to be provided in this prior art system to ensure a repeatable closing behavior of the injector needle valve.

The mentioned pressure waves have an influence on the shape of the injection rate during the injection event. To make sure that all injectors of a multicylinder engine do have the same performance it is preferable to build the high pressure section of the injection system of FIG. 1 symmetrically.

Figure 3:
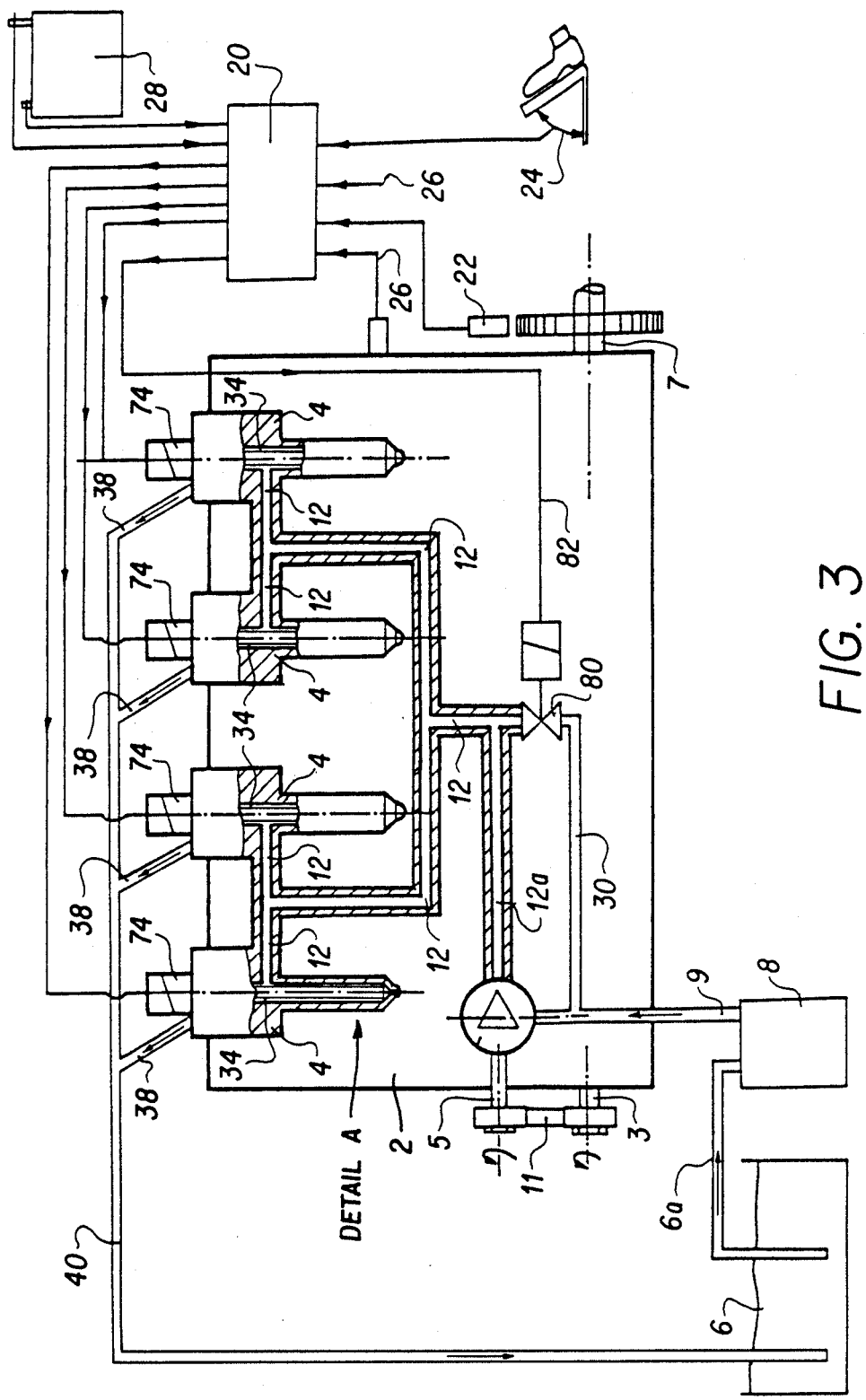
FIG. 3 is a schematic view of an alternate embodiment of the electronically controlled injection system shown in FIG. 1.

In an alternative layout of the fuel injection system according to the present invention shown in FIG. 3, the electronic control unit 20 controls an electrically driven high-to-low pressure spill valve 80. The electrical connection 19 and the actuator 21 within the housing of the pump 10 in the embodiment of FIG. 1 can be eliminated. In this case the high pressure pump 10 will have a constant fuel delivery per revolution of the pump shaft 5, which will be entirely pumped into the high pressure lines 12 (except for some leakage of the pump 10).

The spill valve 80 is of the on/off type valve, timed by the control unit 20 in a suitable way to release the excess fuel delivered by the pump 10 in a return line 30 and establish the desired pressure in the lines 12 according to the operating conditions of the engine 2. An electrical connection 82 connects the control unit 20 with the electrically driven on/off spill valve 80. The valve 80 could also be a very sensitive adjustable pressure regulator valve capable of evening out to some extent any undesired pressure pulsations generated by the fuel pump 10 or induced by the injectors 4.

The power demand of the pump 10 for part-load running conditions of engine 2 in this case will be somewhat higher compared to the design of FIG. 1, since fuel in excess must be pressurized. However, the layout of FIG. 3 allows achievement of another advantage as explained below.

If the spill valve 80 is an electrically driven on/off valve, when it is switched on by means of an electric signal of the control unit 20 fuel will flow in the line section 12a from the pump 10 to the valve 80. When the valve 80 is switched off, the moving fuel column in line 12a will be stopped and a positive dynamic pressure wave will propagate upstream of the valve 80 into the line 12a as well as into the remaining lines 12 leading to the injectors. After a given travel time this positive dynamic pressure wave will reach the seat 56 (see also FIG. 2) of one or more injectors 4.

By timing the off-signal of the valve 80 appropriately by means of the control unit 20 in such a way that the positive dynamic pressure wave arrives at an injector 4 when the injection event begins, it is possible to obtain a higher effective injection pressure (in the range 20 to 30%) compared to the static pressure without the positive dynamic pressure wave. This allows an increase in the effective injection pressure at full load engine running conditions, when a high injection pressure is required. Also, since in this case the pump 10 must generate a lower pressure, less mechanical input power at shaft 5 is required.

Since the timing of the off-signal of the valve 80 is determined by the electronic control unit 20, it can be governed flexibly to obtain the desired effect for all injectors 4 employed in the injection system as well as, if needed, at different engine running speeds and load conditions. It has to be noted that the essential criteria of the injection system of the present invention, as explained earlier while describing FIG. 1, must still apply in order to obtain the benefit of the advantage of said positive dynamic pressure wave.

Figure 4:
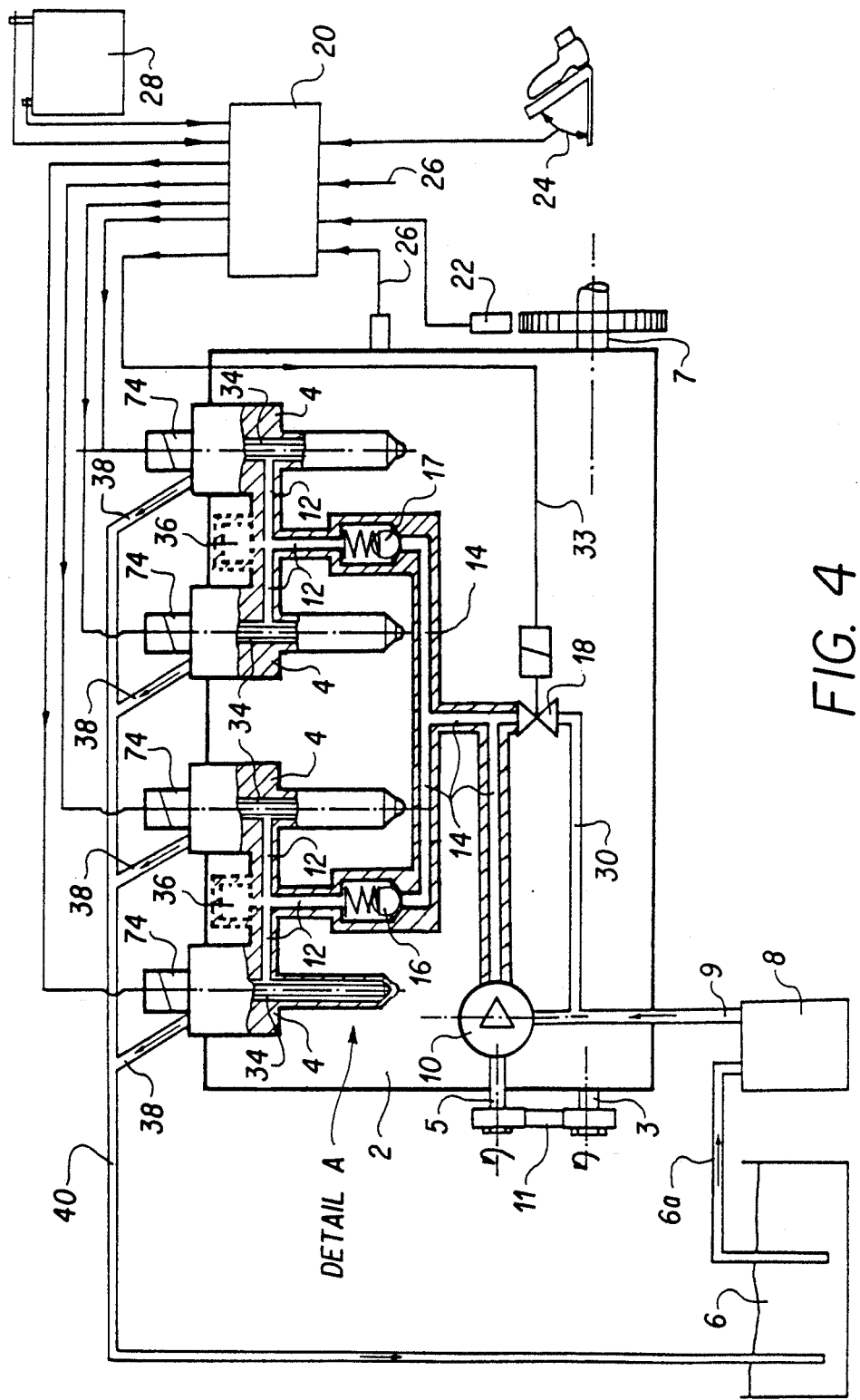
FIG. 4 is a schematic view of a second alternate embodiment of the electronically controlled injection system shown in FIG. 1.

In a second alternative layout of the fuel injection system according to the present invention, shown in FIG. 4, the pump 10 pumps the fuel into high pressure pipes 14, which are connected to two check valves 16 and 17 and to a discharge valve 18. The check valves 16 and 17 could, for example, be spring-loaded ball valves. The pump 10 and the discharge valve 18 work together in an analogous manner as pump 10 and spill valve 80 of the embodiment shown in FIG. 3. Discharge valve 18 is connected to a return line 30 and is controlled by control unit 20 via an electrical connection 33. The fuel pressure in the lines 14 will be maintained by the discharge valve 18 at a pressure level according to and appropriate for given operating conditions of the engine 2.

It is important to note that the high pressure fuel line sections 14 are permanently under a high fuel pressure during operation of the engine 2 and are arranged between the outlet side of the pump 10 and the check valves 16 and 17. The pump 10, as in many other known hydraulic systems, must also have at least one additional check valve placed within the pump housing upstream to the high pressure outlet of the pump 10. This additional check valve is not shown in FIG. 1, 3 and 4.

It must be noted that, by a suitable layout of each one of the check valves 16 and 17, the fuel flow in the direction from the line sections 14 across a check valve 16 or 17 into the subsequent part, i.e. lines 12, of the injection system can occur practically undisturbed. The flow path in this direction is thus substantially unrestricted. Only in the opposite direction is the flow blocked. As a consequence, the fuel injectors 4 are always under a high fuel pressure during engine operation, and not only during the intermittent injection event of any of the injectors, as it is the case in systems of the type disclosed in the prior art.

Downstream of the check valves 16 and 17 are formed two hydraulically separate groups of high pressure lines 12 and injectors 4, each one of them being connected to one check valve. This arrangement can be advantageously employed in engines having many cylinders, such as 6, 8 and 12 cylinder engines. Groups of 2 or more injectors, each one communicating with one check valve, can be formed in a suitable way according to the firing order of the engine cylinders. The pressure waves induced during each injection event by each injector in the lines 12 within one group cannot propagate into another group, and critical overlapping of such pressure waves that can create unstable injection conditions will be avoided. On the other hand, only the group with a lower fuel pressure will be filled through one check valve by the fuel coming from the pump 10.

The control scheme shown in FIG. 1 could also be used to match the high pressure fuel delivery to the high pressure fuel demand of the injection system.

As an important matter, the injectors 4 within one such group are made hydraulically communicating with one another in an unrestricted way, substantially as described earlier in connection with the embodiment of FIG. 1.

As shown in FIG. 4 by dotted lines, one additional fuel chamber 36 per injector group may be added as an alternative for some specific applications where it is more practical to add a fuel chamber in order to optimize the total volume of pressurized fuel within one group.

While preferred embodiments of the present invention have been described for purposes of illustration, the foregoing description should not be deemed a limitation of the invention herein. Accordingly, various modifications, adaptations and alternatives may occur to one skilled in the art without departing from the spirit and scope of the present invention.

I claim:

1. A fuel injection system for an internal combustion engine comprising:
   at least one electromagnetically operated fuel injector for injecting pressurized fuel into a combustion chamber of the internal combustion engine, said at least one fuel injector having a body portion with a valve seat, at least one discharge orifice and an injector valve member cooperating with said valve seat for closing said discharge orifice and being shiftable to be momentarily lifted from said valve seat for opening said discharge orifice and discharging pressurized fuel into a combustion chamber of the internal combustion engine;
   a high pressure fuel pump driven by the internal combustion engine; and
   at least one injection line leading from said pump to said at least one fuel injector and providing a fuel flow path from said pump to a region immediately upstream of said valve seat, the cross-sectional area of said fuel flow path leading from said pump to said region upstream of said valve seat being substantially larger than the total cross-sectional area of all injection orifices of said at least one fuel injector, said fuel flow path being substantially free of flow restrictions to allow a substantially unrestricted fuel communication between said pump and said region around and immediately upstream of said valve seat, the fuel pressure in said fuel flow path before, during and after an injection event as well as in the time interval between any two subsequent injection events being substantially equal to the fuel injection pressure.

2. The fuel injection system according to claim, wherein:
   the frequency of the pumping strokes of said fuel pressure pump is the same or an entire multiple of the frequency of the injection events of the totality of the injectors.

3. The fuel injection system according to claim 1, wherein:
   said fuel pump is provided with a drive shaft driven by the crank shaft of the internal combustion engine, the drive ratio between said crankshaft and said drive shaft being an integer.

4. The fuel injection system according to claim 1, wherein; said fuel pump comprises pumping plungers, said pumping plungers are movable according to a harmonic function.

5. Fuel injection system according to claim 4, wherein anyone of the injection events takes places during part of a pumping stroke of anyone of said pumping plungers.

6. The fuel injection system according to claim 1, further comprising:
   an electrically operated spill valve connected to said high pressure injection line and a low pressure return line, and a control unit for controlling the opening and closing of said spill valve for spilling fuel delivered by said fuel pump into said return line in order to adjust the quantity of fuel delivered by said pump to said at least one injector.

7. The fuel injection system according to claim 6, wherein; said fuel pump delivers a constant amount of fuel per pumping stroke.

8. The fuel injection system according to claim 6, wherein:

the timing for the signal to close the spill valve is chosen by the control unit in such a way that the pressure wave induced in said injection line by closing said spill valve reaches the region immediately around and upstream of said valve seat of said at least one injector immediately before or during the momentary opening of said discharge orifice of said injector.

9. The fuel injection system according to claim 1, comprising:

at least four fuel injectors arranged in groups of at least two fuel injectors, the injectors of each group being connected to one another by means of fuel connection lines providing an unrestricted fuel flow path, the injectors of each group being further connected to a common fuel supply line connected to the outlet of said fuel pump.

10. The fuel injection system according to claim 9, comprising:

a check valve arranged between said common fuel supply line and each fuel connection line connecting the injectors of each group, said check valve preventing the flow of fuel in the direction towards said common fuel supply line.

11. The fuel injection system according to claim 10, further comprising:

a fuel chamber for each group of injectors, said fuel chamber being arranged symmetrically with regard to the injectors of the associated group and being connected to all injectors of the respective group by means of fuel lines providing an unrestricted fuel flow path.

12. The fuel injection system according to claim 1, wherein:

the length of the fuel flow path from said fuel pump to said region immediately upstream of said valve seat is the same for all of said fuel injector.

13. The fuel injection system according to claim 1, wherein:

said fuel pump is provided with a drive shaft driven by the crank shaft of the internal combustion engine at the same speed.

* * * * *